(12) United States Patent  
Park et al.

(10) Patent No.: US 7,464,584 B2
(45) Date of Patent: Dec. 16, 2008

(54) SEMICONDUCTOR PROBE AND METHOD OF WRITING AND READING INFORMATION USING THE SAME

(75) Inventors: Hong-sik Park, Seoul (KR); Ju-hwan Jung, Seoul (KR); Hyoung-soo Ko, Seoul (KR); Seung-bum Hong, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 98 days.

(21) Appl. No.: 11/526,689

(22) Filed: Sep. 26, 2006

(65) Prior Publication Data

US 2007/0119240 A1 May 31, 2007

(30) Foreign Application Priority Data

Nov. 12, 2005 (KR) .................. 10-2005-0108294

(51) Int. Cl.
*G01B 5/28* (2006.01)
(52) U.S. Cl. .................................................... 73/105
(58) Field of Classification Search ............. 73/105
See application file for complete search history.

(56) References Cited

U.S. PATENT DOCUMENTS

| | | | | |
|---|---|---|---|---|
| 5,338,932 | A | * | 8/1994 | Theodore et al. ........... 250/306 |
| 5,648,300 | A | * | 7/1997 | Nakayama et al. .......... 438/611 |
| 5,923,033 | A | * | 7/1999 | Takayama et al. .......... 250/234 |
| 6,212,939 | B1 | * | 4/2001 | Thundat ..................... 73/24.02 |
| 6,252,226 | B1 | * | 6/2001 | Kley .......................... 250/306 |
| 6,349,591 | B1 | * | 2/2002 | Fretigny et al. ............ 73/105 |
| 6,521,921 | B2 | * | 2/2003 | Lim et al. ................... 257/255 |
| 7,062,243 | B2 | | 6/2006 | Simmons et al. |
| 7,065,165 | B2 | | 6/2006 | Heinonen et al. |
| 7,079,584 | B2 | | 7/2006 | Feher |
| 7,099,688 | B2 | | 8/2006 | Wilson |
| 7,106,232 | B2 | | 9/2006 | Harberts et al. |
| 7,106,684 | B2 | * | 9/2006 | Nam .......................... 369/126 |
| 7,110,434 | B2 | | 9/2006 | Currivan et al. |
| 7,110,735 | B2 | | 9/2006 | Abe |
| 7,123,892 | B2 | | 10/2006 | Li et al. |

(Continued)

FOREIGN PATENT DOCUMENTS

JP          7-159465 A          6/1995

(Continued)

OTHER PUBLICATIONS

KR 10-2003-0087372 KIPO machine translation.*

*Primary Examiner*—Michael Cygan
(74) *Attorney, Agent, or Firm*—Sughrue Mion, PLLC

(57) ABSTRACT

A semiconductor probe and a method of writing and reading information using the same. The semiconductor probe includes a cantilever and a tip formed on an end portion of the cantilever to write or read information on or from a ferroelectric medium on a surface of which an electrode is formed. The tip includes a resistive region lightly doped with semiconductor impurities and a conductive region heavily doped with the semiconductor impurities. The cantilever includes an electrostatic force generation electrode formed on a bottom surface facing the medium. A contact force between the tip and the medium is adjusted by selectively applying a voltage between the electrode formed on the ferroelectric medium and the electrostatic force generation electrode.

4 Claims, 5 Drawing Sheets

U.S. PATENT DOCUMENTS

| | | |
|---|---|---|
| 7,136,622 B2 | 11/2006 | Rofougaran et al. |
| 7,142,665 B2 | 11/2006 | Barron et al. |
| 7,149,263 B2 | 12/2006 | Higure |
| 7,281,419 B2 * | 10/2007 | Wang et al. .................. 73/105 |
| 2002/0174715 A1 * | 11/2002 | Kim et al. .................... 73/105 |

FOREIGN PATENT DOCUMENTS

| | | |
|---|---|---|
| KR | 1999-0069113 A | 9/1999 |
| KR | 2003-0087372 A | 11/2003 |

* cited by examiner

SEMICONDUCTOR PROBE AND METHOD OF WRITING AND READING INFORMATION USING THE SAME

CROSS-REFERENCE TO RELATED APPLICATIONS

This application claims priority from Korean Patent Application No. 10-2005-0108294, filed on Nov. 12, 2005, in the Korean Intellectual Property Office, the disclosure of which is incorporated herein in its entirety by reference.

BACKGROUND OF THE INVENTION

1. Field of the Invention

The present invention relates to a semiconductor probe used for scanning probe microscopy (SPM) and a method of writing and reading information using the same and, more particularly, to a semiconductor probe having a cantilever structure that can adjust a contact force between a tip and a medium and a method of writing and reading information using the same.

2. Description of the Related Art

A probe is used in a variety of SPM technologies. For example, the probe is used in a scanning transmission microscope (STM) for reading information by detecting a current that flows according to a voltage difference between the probe and a sample, an atomic force microscope (AFM) using an atomic force generated between the probe and the sample, a magnetic force microscope (MFM) using a force generated between a magnetic field of the sample and the magnetized probe, a scanning near-field optical microscope (SNOM) improving a resolution limitation caused by a wavelength of a visible ray, an electrostatic force microscope (EFM) using an electrostatic force generated between the sample and the probe, and the like.

Recently, technology of writing/reading information using the STM has been developed. A recording density of a typical magnetic writing/reading device such as a hard disk drive has dramatically increased for decades. Furthermore, owing to the optimization of a tribology characteristic in an interface between a head and a disc, a high reliability of the writing/reading device is achieved. For example, a recording density of 100 giga (G)bit/in$^2$ is achieved in a longitudinal magnetic recording and recording density above 100 Gbit/in$^2$ is achieved in a perpendicular magnetic recording. However, a magnetic recording technology has a limitation in increasing the recording density due to a superparamagnetic limit. As the SPM that can measure a surface property with a nano-scale using an extremely-sharp probe tip is proposed, it is expected that a recording density of a tera (T)bit/in$^2$ level will be possible. As the recording technology using SPM has an advantage of reducing a size of the writing/reading device, it emerges as a next generation recording technology. However, reliability related to a tribology characteristic in an interface between the probe tip and the recording medium is a technical problem to be solved.

FIG. 1 is a schematic view illustrating a mechanical force that is generated by a bending of a cantilever and functions as a contact force in a probe according to the related art. A probe includes a tip 3 and a cantilever 5. The tip 3 contacts a medium 7 using a bending of the cantilever 5. At this point, a degree of the bending is determined according to a required contact force. For example, when the writing and reading of the information are performed using a semiconductor probe having a resistive tip, a relatively high contact force is required to stably write and read the information using a relatively small amount of a voltage applied.

At this point, when the contact force is determined by only a mechanical force, a problem that arises is that a contact force applied during the writing is identical to that applied during the reproduction. When the contact force increases to realize a stable writing, the tip of the probe may be worn. Particularly, when a ferroelectric such as PbZrTio (PZT) is used as the recording medium, surface hardness of the recording medium is increased. In this case, the wear of the tip further increases. When the extremely-sharp tip is used, contact pressure of the tip with the medium increases. In this case, the tip may be easily damaged and an amount of wear debris increases, causing pollution. There is a finding showing that when the tip is designed to be blunt in a sliding direction, a wear rate of the tip is reduced. However, in this case, the recording density is reduced. Therefore, in order to enhance the contact force of the tip, the design of the tip must be optimized considering the recording density, sliding speed, and material of the medium. In order to ensure wear-resistance of the tip, the tip or medium may be coated with a protecting material such as diamond. Korean laid-open patent No. 1999-069113 discloses a method of using a tip coated with diamond. However, in the writing and reading using the ferroelectric medium, the coating of different material on the tip or medium deteriorates the writing/reading performance. When the bending of the cantilever is determined in response to the contact force that is appropriate for stable writing, the writing and reproduction properties are deteriorated due to the increased wear of the tip. When the bending of the cantilever is determined in response to the contact force that can minimize the wear of the tip, the resulting unstable recording deteriorates the writing/reading performance. Therefore, the contact force between the tip and the medium must be properly determined considering the above problems. However, as described above, when the contact force is determined by only the mechanical force generated by, for example, the bending of the cantilever, a problem arises in that a contact force applied during the writing is identical to that applied during the reproduction. Therefore, it is very difficult to simultaneously satisfy both a condition of a weak contact force that minimizes the wear of the tip and a condition of a strong contact force that enables a stable recording.

SUMMARY OF THE INVENTION

The present invention provides a semiconductor probe that adjusts a contact force between a tip and a medium to minimize wear of the tip and ensure writing/reading performance at a high recording density and a method of writing and reading information using the same.

According to an aspect of the present invention, there is provided a semiconductor probe including: a cantilever; and a tip formed on an end portion of the cantilever to write or read information on or from a ferroelectric medium on a surface of which an electrode is formed, the tip including a resistive region lightly doped with semiconductor impurities and a conductive region heavily doped with the semiconductor impurities, wherein the cantilever includes an electrostatic force generation electrode formed on a bottom surface facing the medium and a contact force between the tip and the medium is adjusted by selectively applying a voltage between the electrode formed on the ferroelectric medium and the electrostatic force generation electrode.

According to another aspect of the present invention, there is provided a method of writing or reading information on or from a ferroelectric medium using a semiconductor probe including a cantilever having an electrostatic force generation electrode formed on a surface facing the ferroelectric medium on a surface of which an electrode is formed and a resistive tip having a lightly doped resistive region and a heavily doped conductive region electrically connected to the electrostatic force generation electrode, the method including: applying, during a writing operation, a voltage between the electrode of the ferroelectric medium and the heavily doped conductive region of the resistive tip to increase a contact force between the ferroelectric medium and the resistive tip by generating an electrostatic force between the electrostatic force generation electrode of the cantilever and the electrode of the ferroelectric medium.

According to still another aspect of the present invention, there is provided a method of writing or reading information on or from a ferroelectric medium using a semiconductor probe including a cantilever having an electrostatic force generation electrode formed on a surface facing the ferroelectric medium on a surface of which an electrode is formed and a resistive tip having a lightly doped resistive region and a heavily doped conductive region that is not electrically connected to the electrostatic force generation electrode, the method including: applying, during a writing operation, a voltage between the electrode of the ferroelectric medium and the heavily doped conductive region as well as between the electrode of the ferroelectric medium and the electrostatic force generation electrode of the cantilever to increase a contact force between the ferroelectric medium and the resistive tip by generating an electrostatic force between the electrostatic force generation electrode and the electrode of the ferroelectric medium.

According to still yet another aspect of the present invention, there is provided a probe for measuring information of a medium which has information on an electric field and on a surface of which an electrode is formed, the probe including: a tip; and a cantilever including an electrostatic force generation electrode formed on a bottom surface facing the medium to adjust a contact force between the tip and the medium by selectively applying a voltage between the electrode formed on the ferroelectric medium and the electrostatic force generation electrode.

BRIEF DESCRIPTION OF THE DRAWINGS

The above and other features and advantages of the present invention will become more apparent by describing in detail exemplary embodiments thereof with reference to the attached drawings, in which.

DETAILED DESCRIPTION OF EXEMPLARY EMBODIMENTS OF THE INVENTION

The present invention will now be described more fully with reference to the accompanying drawings, in which exemplary embodiments of the invention are shown.

Figure 1:
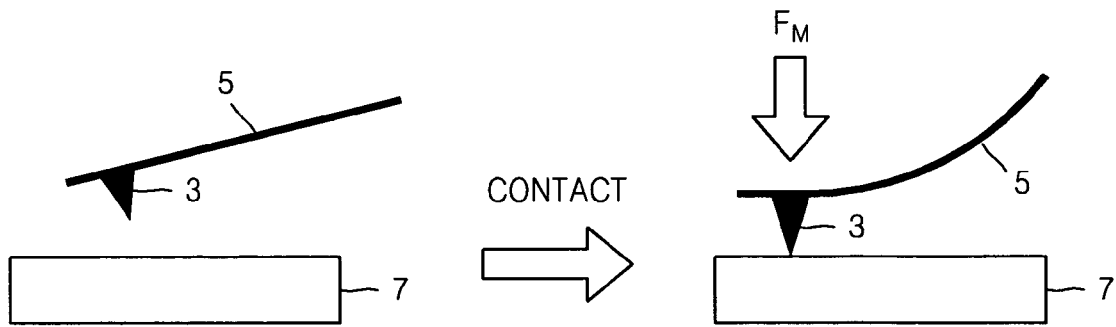
FIG. 1 is a schematic view illustrating a mechanical force that is generated by a bending of a cantilever and functions as a contact force in a probe according to the related art.
Figure 2A:
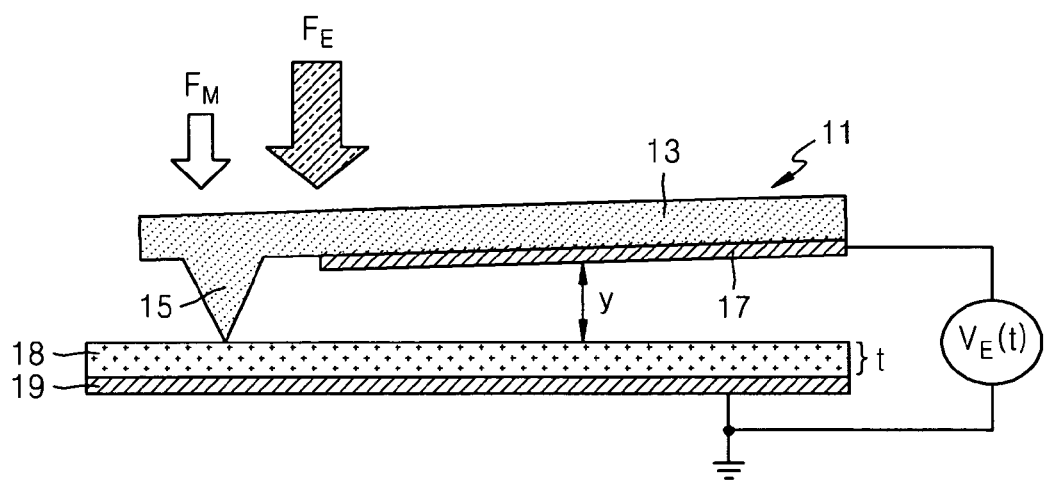
FIG. 2A is a schematic view illustrating a contact force between a medium and a tip of a semiconductor probe according to an exemplary embodiment of the present invention.

FIG. 2A is a schematic view illustrating a contact force between a medium and a tip of a semiconductor probe according to an exemplary embodiment of the present invention.

Referring to FIG. 2A, a probe 11 includes a cantilever 13, a tip 15 formed on one end portion of the cantilever 13, an electrostatic force generation electrode 17 formed on a surface of the cantilever 13, and which faces a medium 18. A contact force is generated between the tip 15 and the medium 18 when the tip 15 contacts the medium 18. The contact force includes a mechanical force $F_M$ generated by the bending of the cantilever 13 and an electrostatic force $F_E$ generated by an electrostatic voltage $V_E$ applied between an electrode 19 formed on a bottom surface of the medium 18 and the electrostatic force generation electrode 17. The mechanical force $F_M$ generated by the bending of the cantilever 13 can be calculated according to the following equation 1.

$$F_M = k \cdot x \qquad \text{Equation 1}$$

where, k is a stiffness of the cantilever and x is a bending displacement of the cantilever. For example, the stiffness of the cantilever is 0.84 N/m and the bending displacement of the cantilever is 1 nm, the contact force $F_M$ becomes 8.4 nN. The electrostatic force can be calculated using an electrostatic energy accumulated between the electrode 19 and the electrostatic force generation electrode 17 according to the following equation 2.

$$F_B = \frac{\partial}{\partial x}\left(\frac{1}{2}CV^2\right) \qquad \text{Equation 2}$$
$$= \frac{\partial}{\partial x}\left(\frac{1}{2} \cdot \frac{C_{air} \cdot C_{media}}{C_{air} + C_{media}}\right)$$
$$\cong -\frac{\varepsilon_0 \varepsilon_1^2 A}{2(\varepsilon_1 y + t)^2} \cdot V^2$$

where, $\epsilon_0$ and $\epsilon_1$ are respectively a dielectric constant of air and a relative dielectric constant of the medium 18, A is a sectional area of the medium lower electrode 19, t is a thickness of the medium 18, and y is a distance between the medium 18 and the electrostatic force generation electrode 17. When the medium 18 is formed of PZT, the relative dielectric constant $\epsilon_1$ is 400, the thickness t of the medium 18 is 0.05 um, the distance y between the medium 18 and the electrostatic force generation electrode 17 is 1 um, and the voltage applied is 5V, the electrostatic force becomes 43.2 nN that is attraction. As described above, the electrostatic force is several times the mechanical force and is selectively generated by selectively applying the voltage. Therefore, the contact force can be effectively adjusted. Since the electrostatic force is in inverse proportion to the distance y between the medium 18 and the electrostatic force generation electrode 17, the electrostatic force can vary by varying the distance y.

Figure 2B:
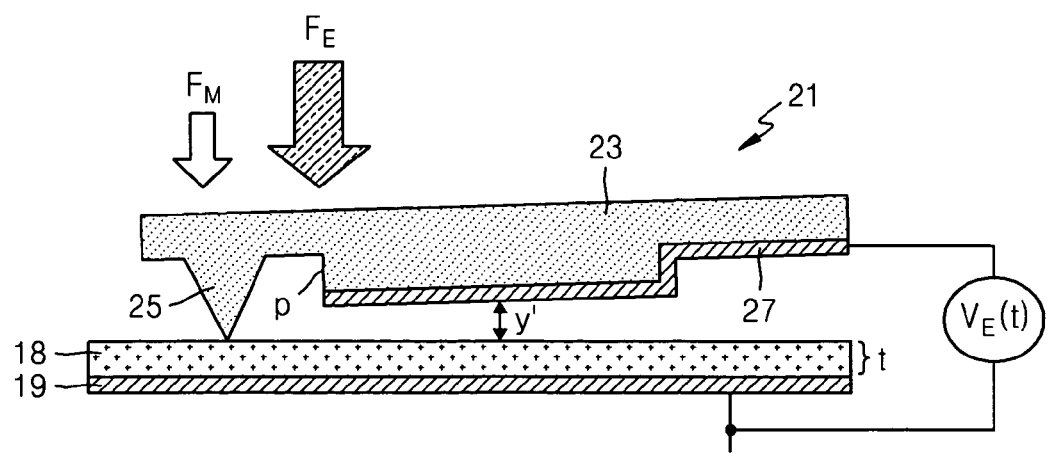
FIG. 2B is a schematic view illustrating a contact force between a medium and a tip of a semiconductor probe according to another exemplary embodiment of the present invention.

FIG. 2B is a schematic view illustrating a contact force between a medium and a tip of a semiconductor probe according to another exemplary embodiment of the present invention.

Referring to FIG. 2B, a probe 21 of this embodiment is identical to that of the foregoing embodiment depicted in FIG. 2A except that a bottom surface of a cantilever 23, which faces the medium 18, is stepped. That is, a protruding portion P is formed on the bottom surface and extends from a location spaced apart from a tip 25 by a predetermined length. Therefore, a distance y' between an electrostatic force generation electrode 27 and a medium 18 is less than that of the y of the foregoing embodiment, thereby increasing the electrostatic force as compared with the foregoing embodiment. At this point, the protruding portion P may be formed to be closer to the tip 25 so that it can be closer to the medium 18, thereby effectively increasing the electrostatic force. A height and length of the protruding portion P may be appropriately determined in response to the required contact force. When a resistive tip is used as the tips 15 and 25, the probes 11 and 21 may be used as a semiconductor probe that can write or read information on or from a ferroelectric medium.

Figure 3A:
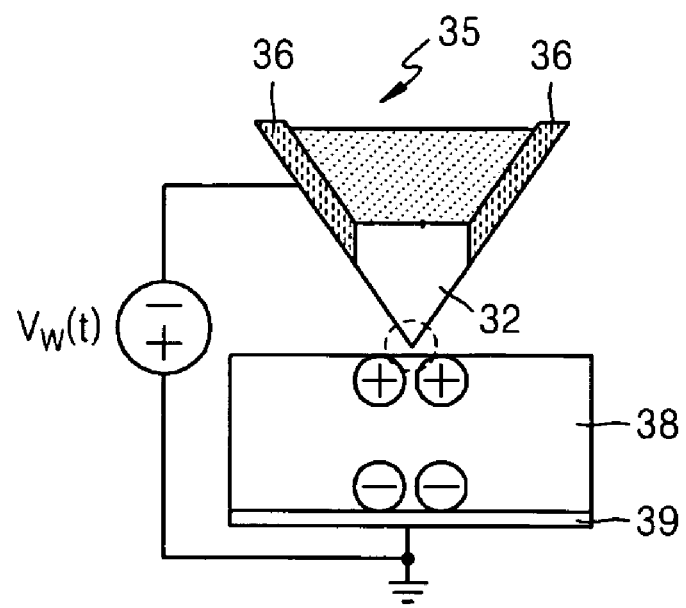
FIGS. 3A and 3B are schematic views illustrating a principal of writing and reading information using a semiconductor probe having a resistive tip.
Figure 3B:
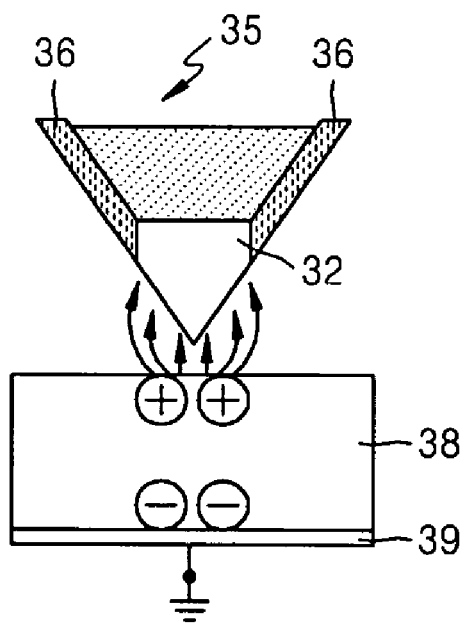

FIGS. 3A and 3B are schematic views illustrating a principal of writing and reading information using a semiconductor probe having a resistive tip.

A resistive tip 35 is doped with first impurities. A resistive region 32 is formed on an extreme end of the tip 35 by lightly doping second impurities in the extreme end of the tip 35. A conductive region 36 is formed on an inclined surface of the tip around the resistive region 32 by heavily doping the second impurities in the inclined surface. In a writing operation, as shown in FIG. 3A, a voltage is applied between the conductive region 36 of the tip and an electrode layer 39 formed on a bottom surface of a ferroelectric medium 38 so that ferroelectric domains can be polarized. In a reading operation, as shown in FIG. 3B, a method of measuring a resistance variation of the resistive region 32, which is caused by an electric field generated by the polarized ferroelectric domains is used. That is, a depletion region is formed at an extreme end portion of the resistive tip 35 by an external electric field to reduce a sectional area of the resistive region 32 and the reduction of a resistance of the resistive region 32 is measured.

Figure 4A:
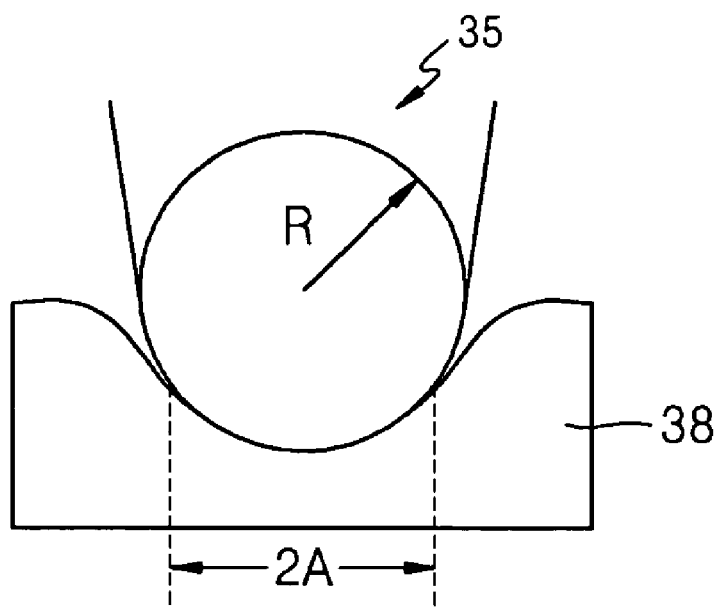
FIGS. 4A and 4B are enlarged views of a broken circle portion of FIG. 3A for illustrating a relationship between a contact force between a medium and a tip and a dot size.
Figure 4B:
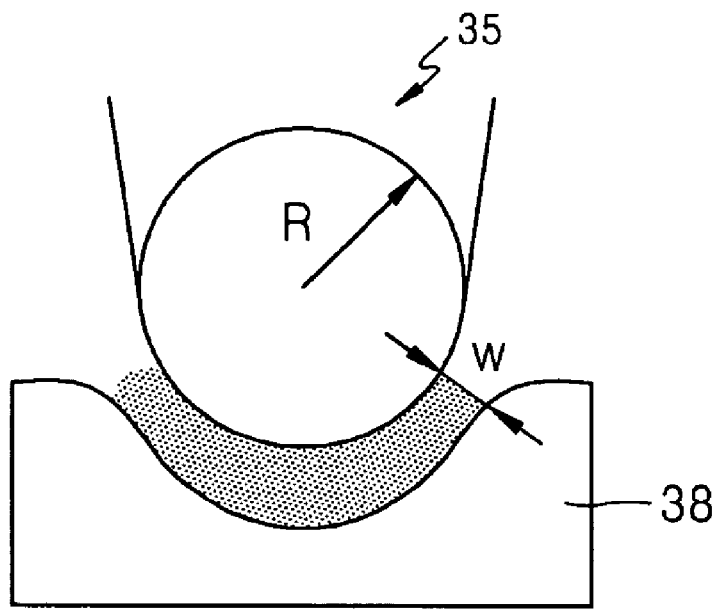

FIGS. 4A and 4B are enlarged views of a dotted-circle of FIG. 3A for illustrating a relationship between the contact force between the medium and the tip and a recorded dot size. An affection of the contact force on a writing property will be now described with reference to FIGS. 4A and 4B.

Referring to FIGS. 4A and 4B, the reference sign R indicates a radius of the extreme end of the tip. A size of a dot that is polarized by a writing voltage depends on the contact force between the medium and the tip. FIG. 4A shows a case when a strong contact is realized. That is, the contact between the tip and the medium is perfectly realized. When the writing voltage is applied, a voltage $V_{tip}$ of the tip is identical to a voltage $V_s$ of the surface of the medium. Therefore, the size of the dot is identical to a contact length 2A. However, when the contact is not perfectly realized, as shown in FIG. 4B, a distance w between the tip and the surface of the medium is not zero but a finite value. In this case, a relatively high dielectric constant of the ferroelectric medium enhances the voltage reduction by the distance w. Therefore, the voltage $V_s$ of the surface of the medium can be calculated according to the following equation 3.

$$V_s = \gamma \cdot V_{tip}, \ 0 < \gamma < 1 \qquad \text{Equation 3}$$

In this case, the size of the dot will be less than the size 2A of the dot in FIG. 4A. That is, the writing property varies according to the contact force. Therefore, in order to stably write the information, a strong contact is required between the medium and the tip.

Since the probe having the electrostatic force generation electrode 17 or 27 generates the contact force including the mechanical force formed by the bending of the cantilever and the electrostatic force formed by the electrostatic force generation electrode 17 or 27, the writing can be performed under the higher contact force.

Figure 5A:
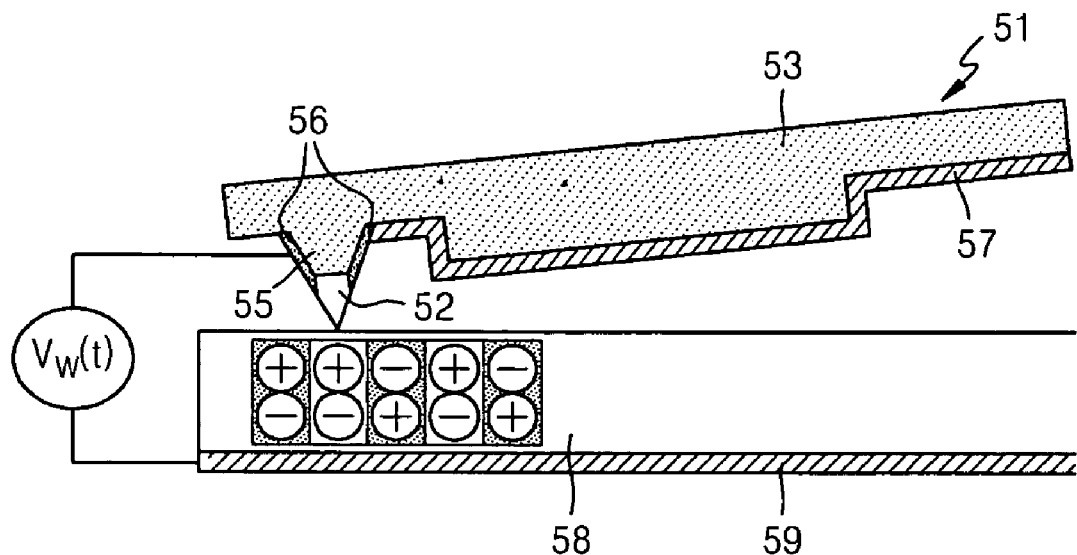
FIG. 5A is a sectional view illustrating a method of writing and reading information using a continuous-mode type semiconductor probe according to an embodiment of the present invention.
Figure 5B:
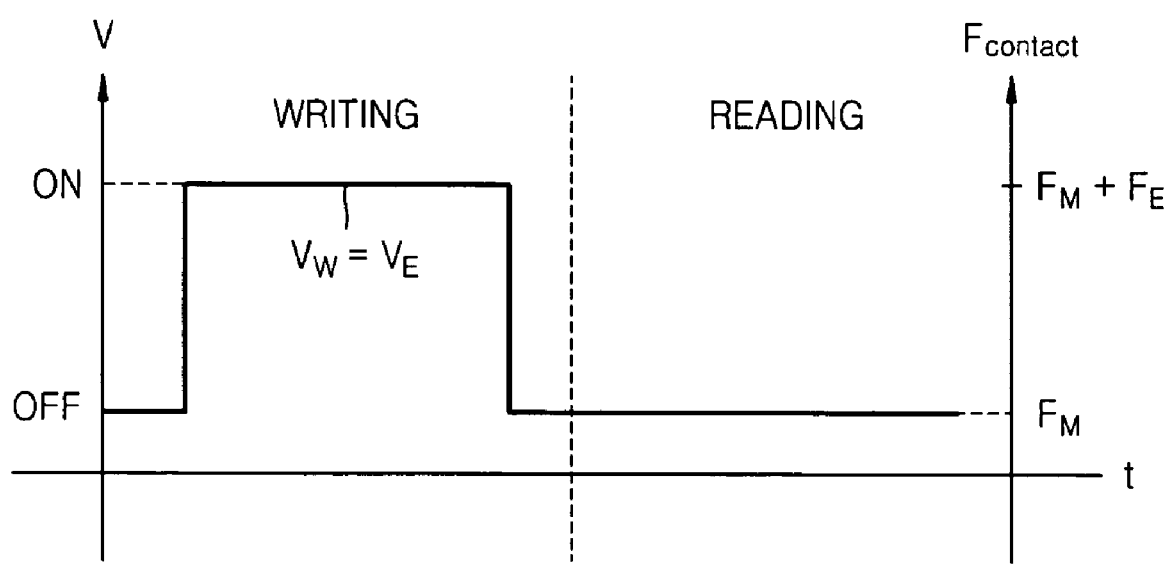
FIG. 5B is a graph illustrating a writing voltage, an electrostatic force generation voltage and a contact force during the writing and reading of information using the continuous-mode type semiconductor probe depicted in FIG. 5A.

FIG. 5A is a sectional view illustrating a method of writing and reading information using a continuous mode semiconductor probe according to an exemplary embodiment of the present invention and FIG. 5B is a graph illustrating a writing voltage, an electrostatic force generation voltage and a contact force during the writing and reproduction of information. A continuous mode means that a writing signal is inputted such that the polarization can occur continuously without an interval between the domains of the medium.

Referring to FIG. 5A, a continuous-mode type semiconductor probe 51 includes a cantilever 53 and a resistive tip 55 formed on one end portion of the cantilever 53. An electrostatic force generation electrode 57 is formed on a bottom surface of the cantilever 53, which faces a ferroelectric medium 58. The bottom surface of the cantilever 53 may be flat or stepped. There is no gap between the resistive tip 55 and the electrostatic force generation electrode 57. That is, the electrostatic force generation electrode 57 is electrically connected to a heavily doped conductive region 56 of the resistive tip 55. In this case, since an electrostatic force generation voltage $V_E$ is applied when a writing voltage $V_W$ is applied, the electrostatic force $V_E$ is always applied during the writing. The writing and reading are realized when the resistive tip 55 is located on the ferroelectric medium 58 having an electrode 59 by a driving unit (not shown).

As shown in FIG. 5B, in the writing operation, the writing voltage $V_W$ is applied between the conductive region 56 of the resistive tip 55 and the electrode 59 formed on the bottom surface of the ferroelectric medium 58. At this point, since the electrostatic force generation electrode 57 of the cantilever 53 is electrically connected to the conductive region 56 of the resistive tip 55, the writing voltage $V_W$ functions as the electrostatic force generation voltage $V_E$ as well as its inherent function. Therefore, upon applying the writing voltage $V_W$, the electrostatic force is generated. Since the contact force includes the mechanical force formed by the bending of the cantilever and the electrostatic force formed by the electrostatic force generation electrode, the strong contact is realized. In this case, the voltage applied to the resistive tip is transmitted to the surface of the medium without being reduced. As a result, the domains of the ferroelectric medium 59 are polarized to stably perform the writing. In the reading operation, the resistance variation of the resistive region 52 by the electric field generated by the polarized domains is detected. In this case, no writing voltage $V_W$ is applied between the heavily doped conductive region 55 and the electrode 59 and thus no electrostatic force generation voltage $V_E$ is applied. That is, only the mechanical force generated by the bending of the cantilever acts as the contact force in the reading operation, thereby reducing the wear of the resistive tip.

Figure 6A:
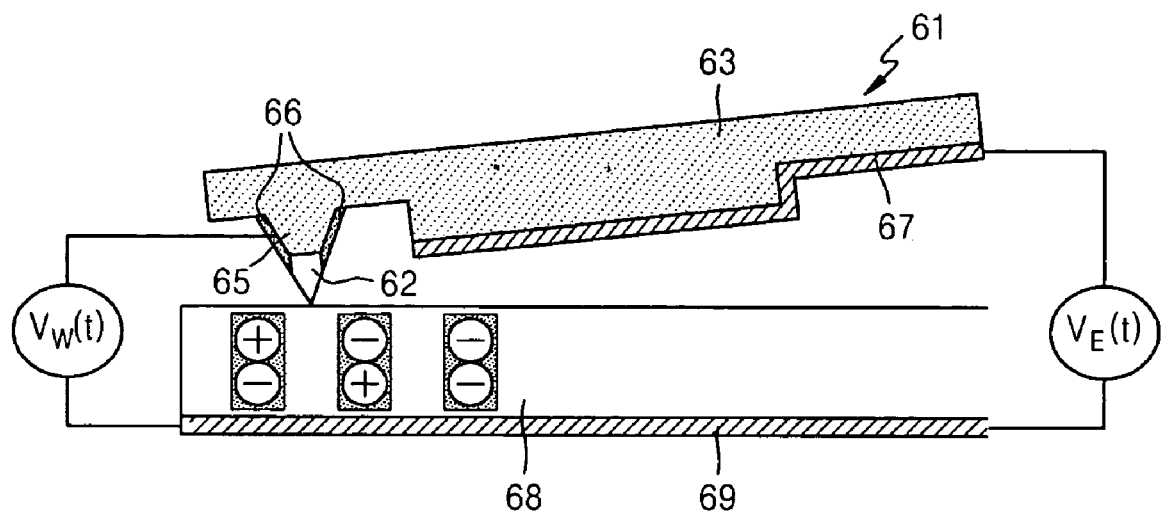
FIG. 6A is a sectional view illustrating a method of writing and reading information using a discontinuous-mode type semiconductor probe according to another embodiment of the present invention.
Figure 6B:
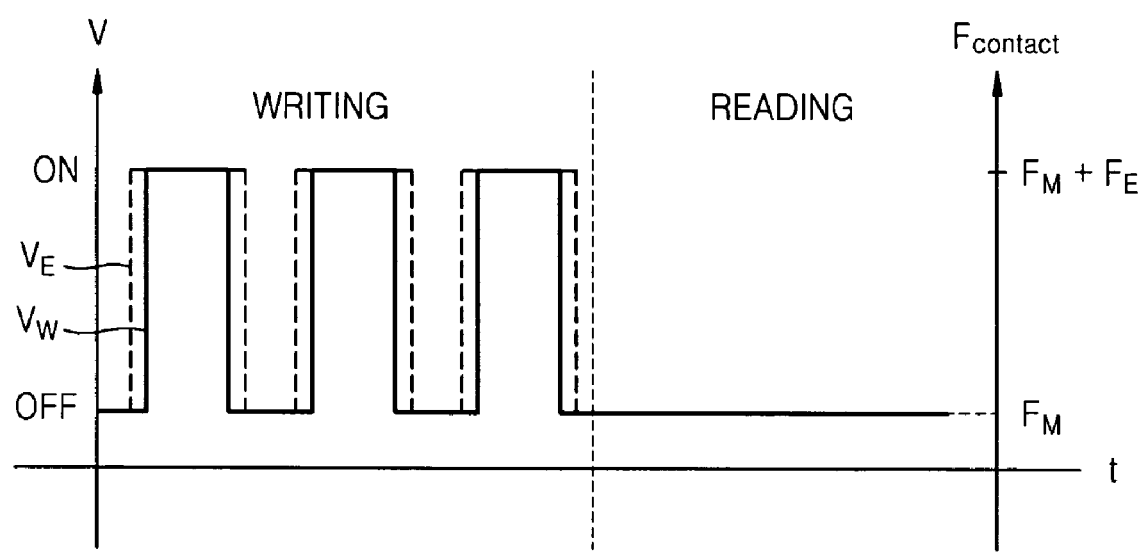
FIG. 6B is a graph illustrating a writing voltage, an electrostatic force generation voltage and a contact force during the writing and reading of information using the discontinuous-mode type semiconductor probe depicted in FIG. 6A.

FIG. 6A is a sectional view illustrating a method of writing and reading information using a discontinuous-mode type semiconductor probe according to another exemplary embodiment of the present invention and FIG. 6B is a graph illustrating a writing voltage, an electrostatic force generation voltage and a contact force during the writing and reading of information. A discontinuous mode means that a writing signal is inputted such that the polarization can occur discontinuously at some intervals between the domains of the medium.

Referring to FIG. 6A, a discontinuous-mode type semiconductor probe 61 includes a cantilever 63 and a resistive tip 65 formed on one end portion of the cantilever 63. An electrostatic force generation electrode 67 is formed on a bottom surface of the cantilever 63, which faces a ferroelectric medium 68. The bottom surface of the cantilever 63 may be flat or stepped. The electrostatic force generation electrode 67 is spaced apart from the resistive tip 65. That is, the electrostatic force generation electrode 67 is not electrically connected to a heavily doped conductive region 66 of the resistive tip 65. In this case, an electrostatic force generation voltage $V_E$ is applied independently of a writing voltage $V_W$. The writing and reading are realized when the resistive tip 55 is located on the ferroelectric medium 68 having an electrode 69 by a driving unit (not shown).

As shown in FIG. 5B, in the writing operation, the writing voltage $V_W$ is applied between the conductive region 66 of the resistive tip 65 and the electrode 69 formed on the bottom surface of the ferroelectric medium 68 and the electrostatic force generation voltage $V_E$ is applied between the electrostatic force generation electrode 67 and the electrode 69. The writing voltage $V_W$ is discontinuously applied. At this point, since the heavily doped conductive region 62 of the resistive tip 65 is not electrically connected to the electrostatic force generation electrode 67, upon applying the writing voltage $V_W$, the electrostatic force generation voltage $V_E$ must be applied. Switches (not shown) for applying the writing voltage $V_W$ and the electrostatic force generation voltage $V_E$ may be simultaneously turned on and off. Alternatively, in order to enhance the contact force, the switch for applying the electrostatic force generation voltage $V_E$ may be turned on before the switch for applying the writing voltage $V_W$ is turned on and the switch for applying the electrostatic force generation voltage $V_E$ may be turned off after the switch for applying the writing voltage $V_W$ is turned off.

In the writing operation, since the contact force includes the mechanical force formed by the bending of the cantilever and the electrostatic force formed by the electrostatic force generation electrode, the strong contact is realized. In this case, the voltage applied to the resistive tip is transmitted to the surface of the medium without being reduced. As a result, the domains of the ferroelectric medium 69 are polarized to stably perform the writing.

In the reading operation, the resistance variation of the resistive region 62 by the electric field generated by the polarized domains is detected. In this case, no writing voltage $V_W$ is applied between the heavily doped conductive region 55 and the electrode 59 and no electrostatic force generation voltage $V_E$ is applied. That is, only the mechanical force generated by the bending of the cantilever acts as the contact force in the reading operation, thereby reducing the wear of the resistive tip.

Consistent with the present invention, the probe is designed to adjust the contact force between the medium and the tip of the probe. That is, the contact force includes the mechanical force and may or may not include the electrostatic force. The electrostatic force may be selectively applied by selectively applying the voltage between the electrode of the cantilever and the electrode of the medium. The probe can be applied as a semiconductor probe having the resistive tip to stably write and read the information on and from the medium. That is, in the writing operation, the electrostatic force is applied together with the mechanical force to realize a stable writing with a uniform dot size. In the reading operation, to minimize the wear of the tip, no electrostatic force is applied but only the mechanical force acts as the contact force.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A semiconductor probe comprising:
    a cantilever comprising an electrostatic force generation electrode formed on a surface of the cantilever facing the medium; and
    a tip formed on an end portion of the cantilever to write or read information on or from a ferroelectric medium which includes an electrode, the tip comprising a resistive region lightly doped with impurities and a conductive region heavily doped with impurities,
    wherein the electrostatic force generation electrode is not electrically connected to the conductive region of the tip, and a contact force between the tip and the medium is adjusted by selectively applying a voltage between the electrode of the ferroelectric medium and the electrostatic force generation electrode of the cantilever so as that the contact force when the semiconductor probe writes information to the ferroelectric medium is stronger than the contact force when the semiconductor probe reads information from the ferroelectric medium.

2. The semiconductor probe of claim 1, wherein the surface of the cantilever facing the medium is stepped.

3. A method of writing or reading information on or from a ferroelectric medium using a semiconductor probe comprising a cantilever having an electrostatic force generation electrode formed on a surface of the cantilever facing the ferroelectric medium which includes an electrode and a resistive tip having a lightly doped resistive region and a heavily doped conductive region that is not electrically connected to the electrostatic force generation electrode, the method comprising:
    a writing operation in which a voltage between the electrode of the ferroelectric medium and the electrostatic force generation electrode of the cantilever is applied; and
    a reading operation in which a voltage between the electrode of the ferroelectric medium and the electrostatic force generation electrode of the cantilever is not applied;
    wherein a contact force between the ferroelectric medium and the resistive tip in the writing operation is stronger than the contact force between the ferroelectric medium and the resistive tip in the reading operation.

4. The method of claim 3, wherein the application of the voltage between the electrode of the ferroelectric medium and the electrostatic force generation electrode of the cantilever starts before the application of the voltage between the electrode of the ferroelectric medium and the heavily doped conductive region of the resistive tip starts, and the application of the voltage between the electrode of the ferroelectric medium and the electrostatic force generation electrode of the cantilever is finished after the application of the voltage between the electrode of the ferroelectric medium and the heavily doped conductive region of the resistive tip is finished.

* * * * *